(12) United States Patent
Schemmann et al.

(10) Patent No.: US 8,704,926 B2
(45) Date of Patent: Apr. 22, 2014

(54) CMOS IMAGE SENSOR WITH SELECTABLE HARD-WIRED BINNING

(75) Inventors: Heinrich Schemmann, Villingen-Schwenningen (DE); Petrus Gijsbertus Maria Centen, Goirle (NL); Sabine Roth, Moenchweiler (DE); Boon Keng Teng, Singapore (SG)

(73) Assignee: Thomson Licensing, Issy-les-Moulineaux (FR)

( * ) Notice: Subject to any disclaimer, the term of this patent is extended or adjusted under 35 U.S.C. 154(b) by 352 days.

(21) Appl. No.: 12/737,723

(22) PCT Filed: Aug. 11, 2009

(86) PCT No.: PCT/EP2009/060396
§ 371 (c)(1),
(2), (4) Date: Feb. 10, 2011

(87) PCT Pub. No.: WO2010/018179
PCT Pub. Date: Feb. 18, 2010

(65) Prior Publication Data
US 2011/0128425 A1 Jun. 2, 2011

(30) Foreign Application Priority Data
Aug. 13, 2008 (EP) ..................... 08305470

(51) Int. Cl.
*H04N 5/335* (2011.01)
*H01L 27/146* (2006.01)

(52) U.S. Cl.
USPC ............................. 348/308; 348/300; 257/444

(58) Field of Classification Search
None
See application file for complete search history.

(56) References Cited

U.S. PATENT DOCUMENTS

| 6,759,641 B1* | 7/2004 | Loose ..................... 250/208.1 |
| 7,091,466 B2* | 8/2006 | Bock ...................... 250/208.1 |
| 2004/0183930 A1 | 9/2004 | Masuyama et al. |
| 2005/0012836 A1* | 1/2005 | Guidash .................... 348/302 |
| 2008/0049131 A1 | 2/2008 | Theuwissen |
| 2008/0062290 A1* | 3/2008 | Lahav et al. .............. 348/280 |

(Continued)

FOREIGN PATENT DOCUMENTS

| EP | 0730133 | 9/1996 |
| EP | 0757476 | 5/1997 |

(Continued)

OTHER PUBLICATIONS

Search Rept: Sep. 17, 2009.

*Primary Examiner* — Lin Ye
*Assistant Examiner* — John H Morehead, III
(74) *Attorney, Agent, or Firm* — Myers Wolin LLC (57) ABSTRACT

A CMOS image sensor allows for selectively outputting one of two vertical resolutions, e.g. 1080 to 720 lines. The scan conversion is implemented completely on the image sensor chip by using smaller sub-pixel cores, which can be electrically combined via switch transistors. A basic circuit of the CMOS image sensor has a number of pixel cells arranged in lines and columns. Each pixel cell has a photosensitive element that converts impinging light into electric charge and a first transfer element. The first transfer elements of m pixel cells arranged consecutively in the same column are arranged for transferring the charge generated in the respective m photosensitive elements during exposure to a single first charge storage element provided for the respective group of m pixel cells. In an exemplary embodiment the switching scheme allows for combining the signal information of either two or three vertically adjacent sub-pixel cores.

16 Claims, 5 Drawing Sheets

(56) References Cited

U.S. PATENT DOCUMENTS

| | | | |
|---|---|---|---|
| 2008/0211949 A1 | 9/2008 | Masuyama et al. | |
| 2009/0066782 A1* | 3/2009 | Choi et al. | 348/25 |
| 2009/0108176 A1* | 4/2009 | Blanquart | 250/208.1 |
| 2009/0289169 A1* | 11/2009 | Yang et al. | 250/201.2 |
| 2010/0060764 A1* | 3/2010 | McCarten et al. | 348/308 |
| 2012/0147229 A1* | 6/2012 | Shah et al. | 348/272 |

FOREIGN PATENT DOCUMENTS

| | | |
|---|---|---|
| EP | 1102323 | 5/2001 |
| EP | 1271930 | 1/2003 |
| EP | 2031869 | 3/2009 |
| EP | 2311249 | 4/2011 |
| JP | 09046596 | 2/1997 |
| JP | 2004304771 | 10/2004 |
| JP | 2005065184 | 10/2005 |
| JP | 2006041866 | 2/2006 |
| JP | 2006041866 | 9/2006 |
| WO | WO2006130518 | 12/2006 |
| WO | WO2010018179 | 2/2010 |

* cited by examiner

CMOS IMAGE SENSOR WITH SELECTABLE HARD-WIRED BINNING

This application claims the benefit, under 35 U.S.C. §365 of International Application PCT/EP2009/060396, filed Aug. 11, 2009, which was published in accordance with PCT Article 21(2) on Feb. 18, 2010 in English and which claims the benefit of European patent application No. 08305470.0, filed Aug. 13, 2008.

The invention relates to a CMOS image sensor that is adapted to selectively produce one out of two possible image resolutions by means of binning, or combination of physical image sensor pixels.

A number of HDTV formats exist, in which the number of vertical video lines and the number of horizontal pixels per vertical video line may be different. Common formats have 720 vertical lines and 1280 pixels per line, also referred to as 1280×720, or 1080 vertical lines and 1920 pixels per line, also referred to as 1920×1080.

Cameras having the capability of selectively producing either one of these two HDTV formats may be preferred due to their flexibility. A single camera that can be used for producing video signals in both formats may reduce cost and simplify logistics and planning of the coverage of an event.

Cameras that are capable of switching between a vertical resolution of 1080 and 720 lines are not common today. Very few cameras exist that can offer this desirable flexibility, which use special legacy CCD imagers. CCD imagers, however, cannot be manufactured with the same functionality on one chip the way it is possible for CMOS imagers.

In general, several ways are known for providing imagers allowing for outputting video in various video formats.

One known solution modifies the so-called "region of interest" on the image sensor. In this type of image sensor only the centre part of the image sensor array is read out and used in a lower resolution mode. This method is also referred to as "cropping" or "digital zoom". The method may be implemented by discarding pixels had actually been read out but are not needed because they lie outside of the region of interest, or by reading out only those pixels that are needed in the desired video format. One benefit of reading out only those pixels that are actually needed is an increase of the maximum possible frame rate. However, the viewing angle is changed, so that the same lens behaves more like a "zoom" or "tele" and cannot provide a wide angle focal length. This behaviour is also referred to as "focal length multiplication" or virtual elongation of the focal length, i.e. the focal length of a lens appears to be longer in the lower resolution mode than in the higher resolution mode. This property may be compared to the so-called digital zooming, where a smaller number of actual pixels are used to fill the screen or viewfinder. Further, for the same viewing angle and distance to an object to be captured, the depth of field is changed. For example, shooting from the same position, with same lens aperture, or f-number, but enlarging the image to a given reference size, will yield a reduced depth of field. On the other hand, shooting a similarly-framed shot the smaller image sensor's depth of field is greater. This may be considered undesired, since it may change the camera artist's desired image composition. Yet further, the lens is unnecessarily large and heavy. Yet further, there is no increase in performance, e.g. SNR, when switching to the lower resolution format, as it is the case for other approaches.

Another known solution is performing a scan conversion in the digital domain, after the image has been captured using the higher resolution of the sensor. Here, images originating from the sensor IC always have the same, higher resolution format. Vertical scaling, i.e. reduction of the number of vertical lines, is done by digital filters implemented external to the imager. In the same way the region of interest may be selected in the digital domain, after capturing the scene. In this approach the frame readout speed of the imager is unchanged as compared to the higher resolution, which may be considered a disadvantage. Further, the system's power dissipation will be higher due to the processing required.

Yet another known solution is performing the scan conversion inside the image sensor chip using analogue signal processing. During the line-by-line readout process of the pixel cells, signals from different lines are weighted and added in the column readout circuit. In fact this implements a vertical filtering and sampling rate conversion process. An example of this kind of scan conversion can be found in European patent application no. EP 07301330.

It is also known to group a number of smaller sub-pixels together, depending on the desired resolution. This process is also referred to as binning. In this case the Imager array has a larger number of lines with smaller pixel cells—called sub-pixels. For a camera that can accommodate 1080 and 720 vertical lines 2160 lines of sub pixels in the full array may be suitable. If groups of 2 vertically adjacent sub-pixels are combined, 1080 vertical lines will result. If groups of 3 vertically adjacent sub-pixels are combined, 720 vertical lines will result.

Figure 1:
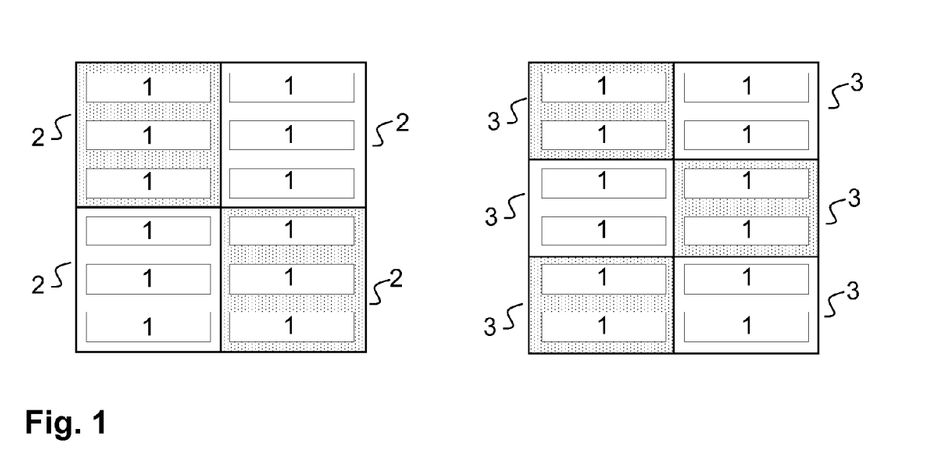

FIG. 1 diagrammatically shows a detail of an image sensor that has sub-pixels, which can be grouped in two different ways. In the figure, six vertically adjacent rows and two horizontally adjacent columns of an image sensor are shown. The image sensor may have a larger number of rows and columns, e.g. 2160 vertically adjacent rows, as suggested in the preceding paragraph.

In the left part of the figure, respective groups 2 of three sub-pixels 1 are formed. The groups are indicated by the surrounding frame and the shading pattern. In this mode, the exemplary binning discussed above would result in 720 vertical lines. In the right part of the figure the same six vertically adjacent rows and two horizontally adjacent columns of an image sensor are shown. Here, respective groups 3 of two sub-pixels 1 are formed. Again, the groups are indicated by the surrounding frame and the shading pattern. In this mode, the exemplary binning discussed above would result in 1080 vertical lines.

This solution is particularly suited for CCD image sensors, where it can be implemented at low additional effort.

U.S. Pat. No. 7,091,466 B2 shows a related CMOS image sensor that allows for combining a multiplicity of pixel signals at the column line level. The known implementation may suffer from poor linearity due to individual amplifiers provided for each pixel prior to merging the resulting signals.

EP 1 102 323 A1 discloses an optoelectronic sensor in which two or more pixels can be connected via FET switches. Each pixel includes a dedicated floating diffusion region for charge storage and an amplifier as well as a select switch. The FET switches directly connect the photodiodes. This implementation exhibits a comparatively high circuit complexity.

WO 2006/130518 A1 discloses a CMOS image sensor including a plurality of pixels, each pixel having a floating diffusion region, wherein the floating diffusion regions of a number of pixels can be connected via switches, for binning of pixels. The known circuit exhibits a relatively high circuit complexity, which reduces the area available for the photosensitive element.

EP 1 271 930 A2 discloses a CMOS image sensor similar to WO 2006/130518 A1, but suggests connecting capacitors rather than floating diffusion regions using switches. This known circuit also exhibits a comparatively high circuit complexity and may also have a reduced photosensitive area.

It is, therefore, desirable to provide a CMOS imager that is capable of binning groups of sub-pixel cores, which imager can selectively capture images in two different vertical resolutions while maintaining the same effective area on which the image is captured and reducing circuit complexity while maintaining global shutter functionality.

According to the invention, vertical scan conversion from a first to a second vertical resolution, e.g. 1080 to 720 lines, is implemented completely on an image sensor chip by using smaller sub-pixel cores, which can be electrically combined via switch transistors. In an exemplary embodiment the switching scheme allows for combining the signal information of either two or three vertically adjacent sub-pixel cores.

An embodiment of the inventive CMOS image sensor has a number of pixel cells arranged in lines and columns. Each pixel cell has a photosensitive element that converts impinging light into electric charge and a first transfer element. The first transfer elements of m pixel cells arranged consecutively in the same column are arranged for transferring the charge generated in the respective m photosensitive elements during exposure to a single charge storage element provided for the respective group of m pixel cells.

In a development of the inventive CMOS imager at least one pixel cell in the group of m pixel cells arranged consecutively in the same column has a second transfer element. The second transfer elements of n pixel cells, n not being equal to m, are arranged for transferring the charge generated in the respective n photosensitive elements during exposure to a single charge storage element provided for the respective group of n pixel cells.

In an exemplary embodiment of the inventive CMOS imager, in a group of six consecutive pixel cells in the same column, the middle two consecutive pixel cells are provided with the second transfer elements for transferring the charge generated in the corresponding two photosensitive elements during exposure to the corresponding single charge storage element.

In a development of the foregoing exemplary embodiment of the inventive CMOS imager the first transfer elements of n pixel cells arranged consecutively in the same column and not having the second transfer element can be controlled for transferring the charge generated in the respective n photosensitive elements during exposure to the single charge storage element provided for the respective group of m pixel cells of which they form part. In a preferred embodiment of the inventive CMOS imager, in a group of six consecutive pixel cells in the same column, the top and bottom two consecutive pixel cells are arranged and can be controlled for transferring the charge generated in the respective n photosensitive elements during exposure to the associated single charge storage element.

In a development of the inventive CMOS imager a reset element is provided with each photosensitive element, the reset element being arranged to switchably connect the photosensitive element to a reset potential.

In a further development of the inventive CMOS imager having first and second transfer elements, if m pixel cells are operatively grouped together for obtaining an image using the first transfer elements, the second transfer elements are controllable to connect the photosensitive elements to a reset potential via corresponding reset elements of the charge storage elements associated with the second transfer elements, and if n pixel cells are operatively grouped together for obtaining an image using the second transfer elements, the first transfer elements are controllable to connect the photosensitive elements to a reset potential via corresponding reset elements of the charge storage elements associated with the first transfer elements.

In another development of the inventive CMOS imager each of the charge storage elements is provided with a reset element for resetting the respective charge storage element. The reset elements switchably connect the charge storage elements to a reset potential.

In yet another development of the inventive CMOS imager an amplifier is provided with each respective charge storage element. A switch element is provided with each amplifier for connecting the output of the amplifier to one of a multiplicity of readout lines, each readout line being shared by multiple pixel cells arranged in the same column.

The charge storage elements may include capacitors integrated on the chip, floating diffusion regions, biased or unbiased PN-doted regions, or the like. The switches may include FET transistors, transmission gates, or the like. The photosensitive elements may include photodiodes, phototransistors, and the like.

In a preferred embodiment, two or three sub-pixel cores, e.g. of a 5-T, or 5 transistor pixel structure, are coupled, wherein a single floating diffusion region is provided for each set of two or three photodiodes. Depending on the mode the transfer gates of the coupled pixel cells are used for coupling either two or three photodiodes to the respective single floating diffusion regions. Using 5-T pixel cells advantageously allows for global shutter functionality.

An embodiment of the inventive CMOS imager has a number of pixel cells arranged in lines and columns. Each pixel cell has a photosensitive element that converts impinging light into electric charge and a first transfer element. The first transfer elements of m pixel cells arranged consecutively in the same column are arranged for transferring the charge generated in the respective m photosensitive elements during exposure to a single first charge storage element provided for the respective group of m pixel cells. At least one pixel cell of a group of m consecutive pixel cells has a second transfer element arranged for transferring the charge generated in the corresponding photosensitive element to a single second charge storage element provided for a group of n consecutive pixel cells. An amplifier is provided with each respective charge storage element and a switch element is provided with each amplifier, which switch element connects the output of the amplifier to one of a multiplicity of readout lines. Each readout line is shared by multiple pixel cells arranged in the same column. A method for controlling the CMOS imager described above in a dual resolution readout mode, in the first resolution readout mode, includes the steps of:

resetting the photosensitive elements of at least m consecutive pixel cells;

exposing the CMOS image sensor to impinging light;

after exposure, controlling the first transfer elements of the exposed pixel cells for transferring the charges accumulated during exposure to the respective single first charge storage element associated with the respective group of m pixel cells;

controlling the switch element associated with the charge storage element, to which the charge has been transferred, and the amplifier, for connecting the output of the amplifier to a readout line for reading out a signal corresponding to an exposed group of pixel cells;

after readout, resetting the charge storage elements associated with a respective group m of pixel cells.

In the second resolution readout mode, the method includes the steps of:
  resetting the photosensitive elements of at least n consecutive pixel cells, n not being equal to m;
  exposing the CMOS image sensor to impinging light;
  after exposure, controlling the second transfer elements of the exposed pixel cells for transferring the charges accumulated during exposure to the respective single second charge storage element associated with the respective group of n pixel cells;
  controlling the switch element associated with the charge storage element, to which the charge has been transferred, and the amplifier, for connecting the output of the amplifier to a readout line for reading out a signal corresponding to an exposed group of pixel cells; and
  after readout, resetting the charge storage elements associated with a respective group of n pixel cells.

The method may further include, in the second resolution readout mode, after exposure, the step of controlling the first transfer elements of groups of n consecutive pixel cells not having a second transfer element for transferring the charges accumulated during exposure to the respective single first charge storage element associated with the respective group of n pixel cells.

For implementing correlated double sampling functionality in either resolution readout mode the method may also include the steps of
  controlling, after resetting and before exposing the photosensitive elements, the first or second transfer elements of the respective groups of consecutive pixel cells for transferring charges corresponding to the reset condition to the respective single charge storage element associated with the respective group of pixel cells;
  controlling the switch element for connecting the output of the amplifier to a readout line for reading out a signal corresponding to an unexposed group of pixel cells; and resetting the charge storage elements after reading out.

For implementing global shutter functionality, the method may further include carrying out the resetting step and the transfer step essentially simultaneous for all pixel cells in the CMOS image sensor.

In a development of the method implementing global shutter functionality the photosensitive elements of all pixel cells are held in reset condition prior to beginning of exposure. After the exposure time is over, the first or second transfer elements of all groups of pixel cells are essentially simultaneously controlled for transferring the charges accumulated during exposure to the respective associated charge storage elements.

In the following, the invention will be described with reference to the attached drawings. In the drawings, FIG. 1 diagrammatically shows a detail of an image sensor that has sub-pixel cores, which can be grouped in two different ways.

In the drawings, like elements are referenced with the same reference symbols, where appropriate.

FIG. 1 has been described in the prior art section of this specification and will not be referred to again.

Figure 2:
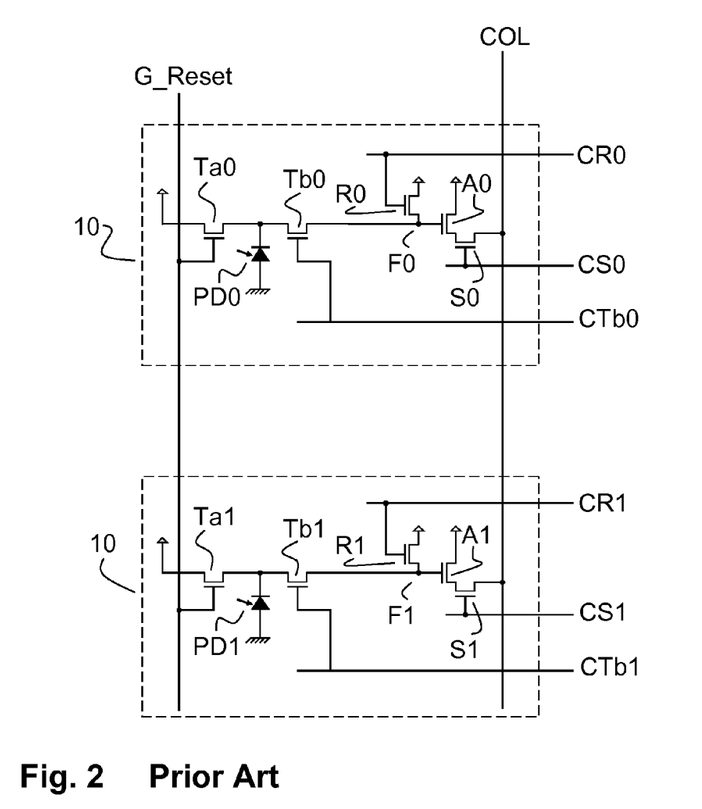
FIG. 2 shows a general 5-T pixel cell of a CMOS image sensor.

FIG. 2 shows two generally known 5-T or 5 transistor CMOS imager pixel cells 10. Each of the pixel cells 10, indicated by the dashed frames, includes a first switch or transfer element Tb0, Tb1 and a reset switch or reset element Ta0, Ta1. The switches or transfer elements may be MOS transistors or transmission gates, for example. Further, a photodiode PD0, PD1 is provided in each of the pixel cells 10. The reset elements Ta0, Ta1 are controlled by a common control line G_Reset and are arranged for resetting the photodiodes PD0, PD1 prior to exposure. In case all photodiodes can be reset simultaneously global or synchronous shutter functionality can be achieved. The first transfer elements Tb0, Tb1 are provided for transferring charges collected by the photodiodes PD0, PD1 during exposure to respective storage elements F0, F1. The first transfer elements Tb0, Tb1 are controlled by corresponding control lines CTb0, CTb1. Storage elements F0, F1 may be implemented as floating diffusion regions integrated in the imager chip, or capacitors (not shown), for example. Storage elements F0, F1 can be reset into an initial state by reset elements R0, R1, which are controlled by corresponding control lines CR0, CR1. Reset elements R0, R1 connect the storage elements F0, F1 to a reset potential. Amplifiers A0, A1 are connected to storage elements F0, F1 for amplifying the signal represented by the charge present in the storage elements F0, F1. The amplifiers A0, A1 may, for example, be implemented as transistors in source follower configuration. Switch elements Sb0, Sb1 are provided, connecting the outputs of the amplifiers A0, A1 to a common column line COL. The switch elements S0, S1 are controlled by corresponding control lines CS0, CS1. Control lines CR0, CR1, CS0, CS1 and CTb0, CTb1 may act as control lines for a complete row of pixels of an image sensor, or for a part of a complete row.

Figure 3:
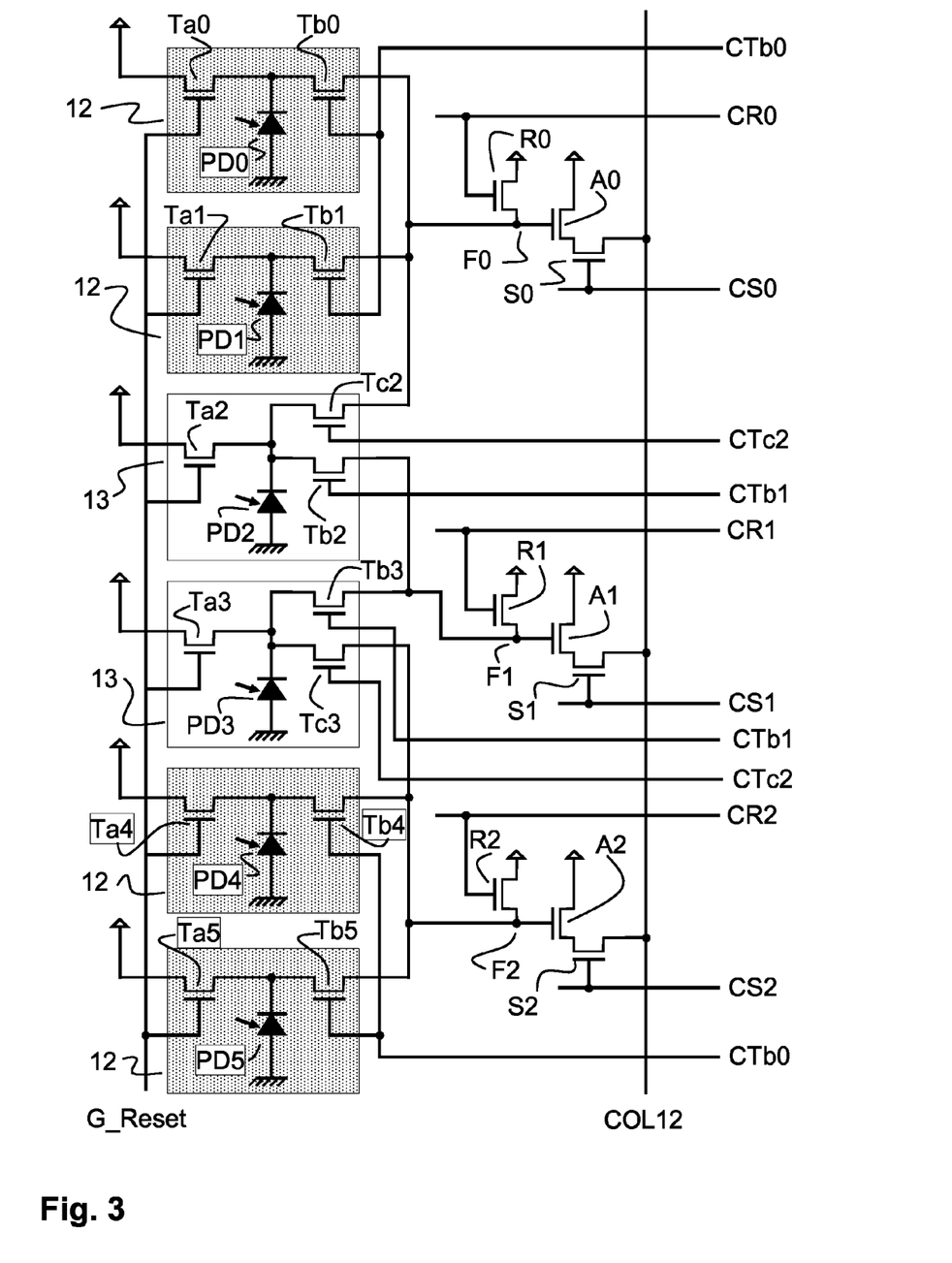
FIG. 3 shows a detail of a CMOS imager according to a first embodiment of the invention in a first resolution mode.

FIG. 3 shows a detail of a CMOS imager according to a first embodiment of the invention in a first resolution mode. In the figure six vertically adjacent sub-pixel cores 12, 13 of the CMOS imager are shown. Sub-pixel cores 12 of a first type have photodiodes PDX and first transfer elements TbX, as well as reset elements TaX (X ranging from 0 to 5, indicating the vertical position in the drawing), arranged in the same way as in the pixel shown in FIG. 2. However, the first transfer elements TbX of pairs of two sub-pixel cores 12 of the first type are arranged to switchably connect the respective photodiodes to a respective single charge storage element FX provided for each pair of sub-pixel cores 12. Sub-pixel cores 13 of a second type additionally have second transfer elements Tc2, Tc3, which are connected to the respective photodiodes PD2, PD3 in a similar manner as the corresponding first transfer elements Tb2, Tb3. However, the second transfer elements Tc2, Tc3 of the sub-pixel cores 13 of the second type are arranged to switchably connect the respective photodiodes to the single charge storage element FX associated with the respective adjacent pair of sub-pixel cores 12 of the first type. The reset elements TaX are provided for allowing global shutter operation and may be implemented as a transfer gate similar to the first and second transfer elements. Further, reset elements R0, R1, R2 are provided for resetting charge storage elements F0, F1, F2 to an initial state prior to receiving charges newly generated in the respective associated photodiodes.

In the first readout mode the first transfer elements Tb0, Tb1 and Tb4, Tb5 of groups of two adjacent sub-pixel cores 12 of the first type and the first transfer elements Tb2, Tb3 of groups of two adjacent sub-pixel 13 of the second type are controlled in such a way that charges generated by light impinging on the corresponding photodiodes PD0, PD1, PD2, PD3, PD4 and PD5 are transferred to respective charge storage elements F0, F1 and F2. The second transfer elements Tc2, Tc3 the sub-pixel cores 13 of the second type are controlled in such a way that they do not transfer charges. For better visibility the respective grouped sub-pixel cores are shown in frames having different shading.

Figure 4:
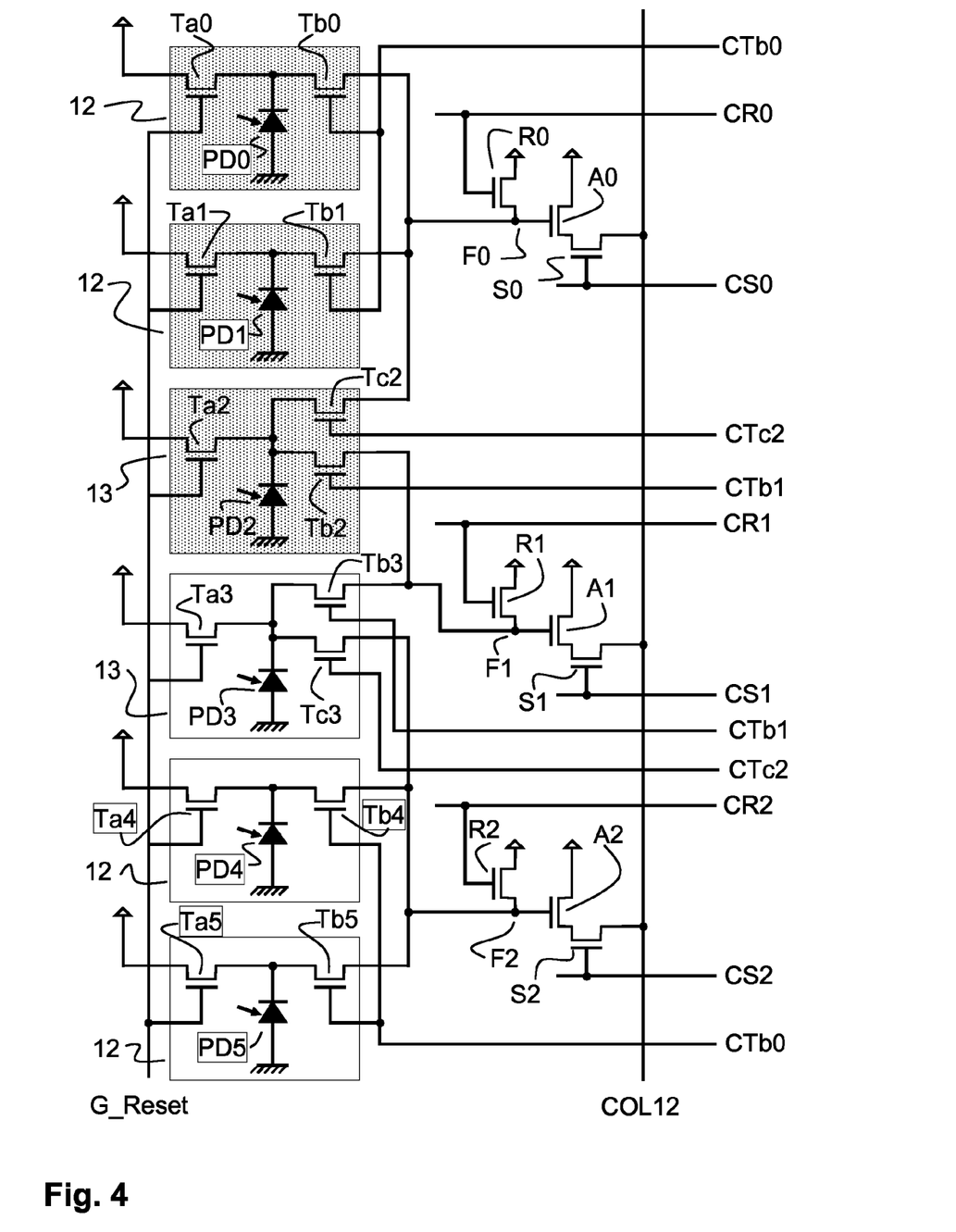
FIG. 4 shows the detail of the CMOS imager according to the first embodiment of the invention in a second resolution mode.

FIG. 4 shows the same circuit as FIG. 3 but with different shading indicating the different grouping of sub-pixel cores in the second readout mode. In the second readout mode the first transfer elements Tb0, Tb1 and Tb4, Tb5 of groups of two adjacent sub-pixel cores 12 of the first type are controlled in the same way as in the first readout mode. However, the first transfer elements Tb2, Tb3 of sub-pixel cores 13 of the second type are controlled in such a way that they do not transfer charges. Rather, the second transfer elements Tc2, Tc3 of the sub-pixel cores 13 of the second type are controlled in such a way that they transfer charges to the charge storage elements F0, F2 associated with the respective neighbouring group of sub-pixel cores 12 of the first type.

The structure of the exemplary CMOS imager shown in FIGS. 3 and 4 requires three column lines for each column of pixels: supply voltage, global reset line G_Reset and a column COL12 for reading out the acquired signal. It is to be noted that the control lines for controlling reset elements R0, R1, R2 may be individual control lines or shared control lines, depending on whether it is desired to allow for individually resetting the respective charge storage elements F0, F1, F2.

Once the charges generated by light impinging on the photodiodes PD0, PD1, PD2 are transferred to the respective charge storage elements F0, F1 F2 they are amplified and read out in the generally known manner. For this purpose amplifiers A0, A1, A2 as well as switch elements S0, S1, S2 are provided.

Figure 5:
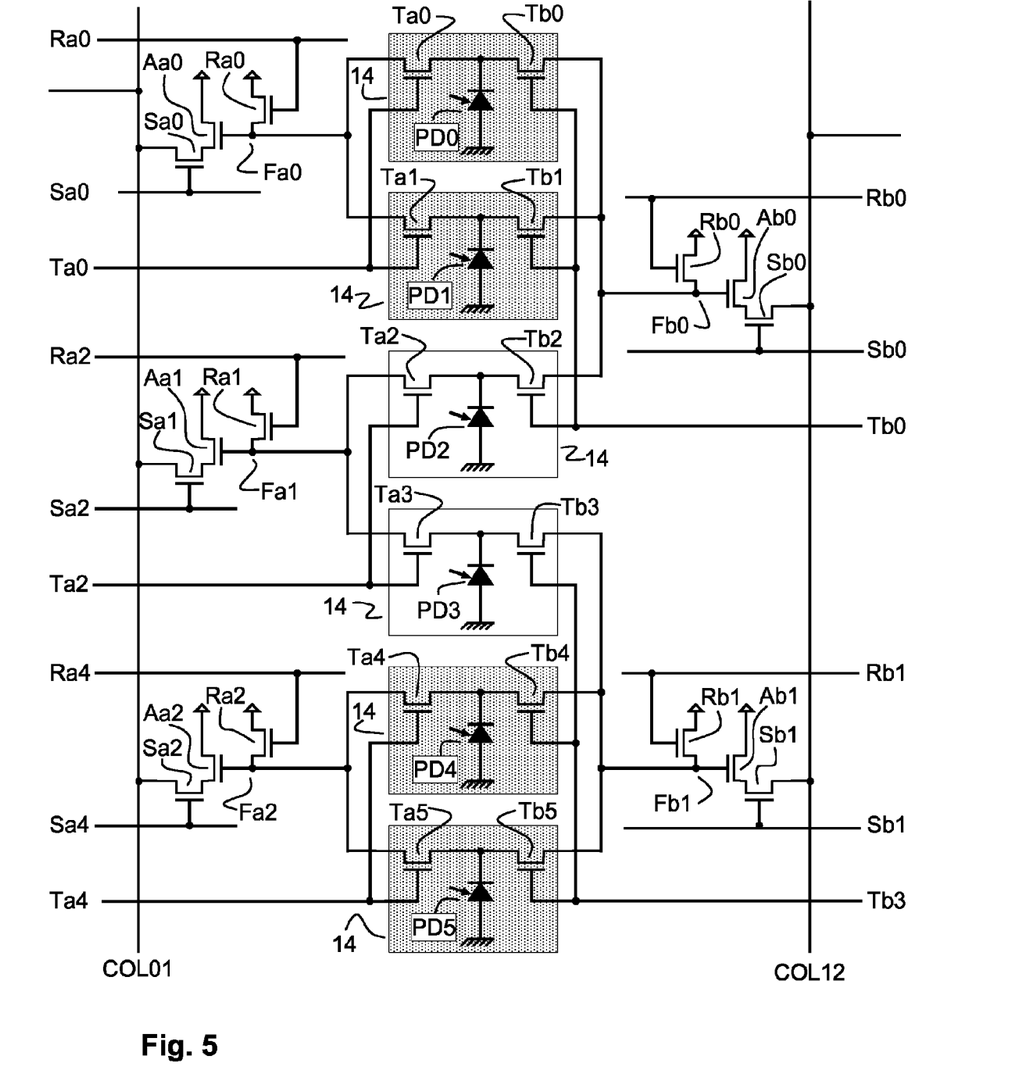
FIG. 5 shows a detail of a CMOS imager according to a second embodiment of the invention in a first resolution mode.

FIG. 5 shows a CMOS imager according to a second embodiment of the invention in a first resolution mode. In this embodiment all sub-pixel cores 14 are identical and have only two transfer elements TaX, TbX connected to each photodiode PDX. Again, X is used for indicating the position of the respective element. Transfer elements TaX of groups of two adjacent sub-pixel cores 14 switchably connect pairs of photodiodes PDX of the respective groups to a respective single charge storage element FaX. For example, photodiodes PD1 and PD2 can be connected to charge storage element Fa0 via transfer elements Ta0 and Ta1. Reset elements RaX are associated with each of the charge storage elements FaX. Further, amplifiers AaX are provided with each of the charge storage elements FaX. Switch elements SaX selectively connect the outputs of the amplifiers AaX to a column readout line COL01. Transfer elements TbX of groups of three consecutive sub-pixel cores 14 switchably connect triplets of photodiodes PDX of the respective groups to a respective single charge storage element FbX. For example, photodiodes PD0, PD1 and PD2 can be connected to charge storage element Fb0 via transfer elements Tb0, Tb1 and Tb2. Reset elements RbX are associated with each of the charge storage elements FbX. Further, amplifiers AbX are provided with each of the charge storage elements FbX. Switch elements SbX selectively connect the outputs of the amplifiers AbX to a column readout line COL12. It is to be noted that a column readout line may be used for each of the two readout modes, i.e. switch elements SaX and SbX of neighbouring columns may be connected to the same column readout line. The reset lines RaX and/or RbX may be controlled individually or in groups, depending on the desired readout mode. In this embodiment each photo diode is connected to two transfer gates, and all sub-pixel cores are identical, allowing for better overall alignment and matching, and providing a homogeneous sensor.

In a first readout mode, after exposure, transfer elements TaX of groups of two adjacent sub-pixel cores 14 are controlled in such a way that charges generated by light impinging on the corresponding photodiodes PDX are transferred to respective associated charge storage elements FaX. It goes without saying that the charge storage elements FaX had been reset by accordingly controlling reset elements RaX prior to receiving the newly generated charges. Readout of a signal corresponding to the charges stored in charge storage elements FaX is performed in the generally known manner involving the amplifiers AaX and the switch elements SaX associated with the respective charge storage elements FaX. In the first readout mode the photodiodes PDX are reset by accordingly controlling transfer elements TbX and reset elements RbX. During reset of the photodiodes PDX in the first readout mode the charge storage elements FbX are also reset. In the first readout mode the amplifiers AbX and switch elements SbX associated with the charge storage elements FbX are not used. Different shading of the frames surrounding the sub-pixel cores 14 indicates the grouping into pairs of adjacent sub-pixel cores 14 in the first readout mode.

Figure 6:
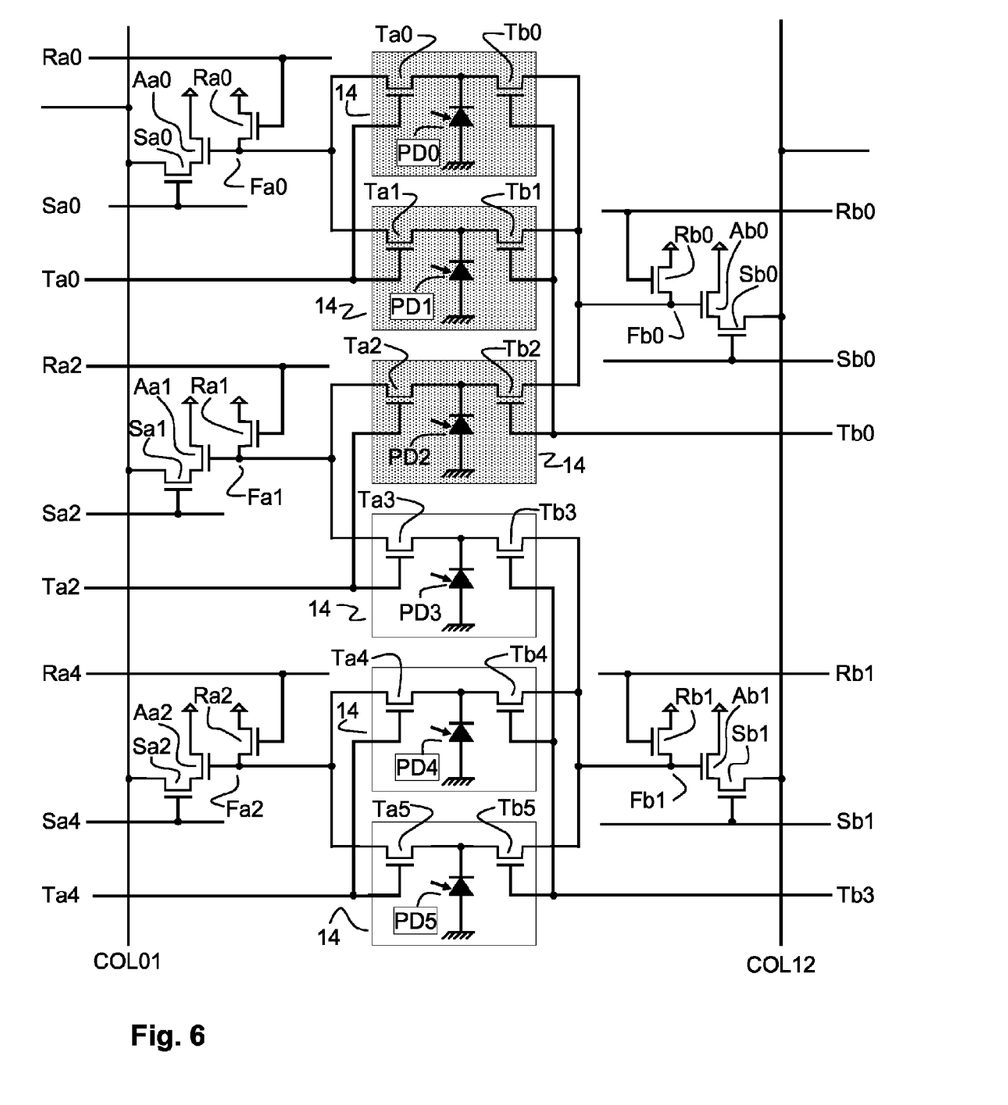
FIG. 6 shows the detail of the CMOS imager according to the second embodiment of the invention in a second resolution mode.

FIG. 6 shows a CMOS imager according to the second embodiment of the invention in a second resolution mode. FIG. 6 shows the same circuit as FIG. 5 but with different shading indicating the different grouping of sub-pixel cores in the second readout mode. In the second readout mode, after exposure, transfer elements TbX of groups of three consecutive sub-pixel cores 14 are controlled in such a way that charges generated by light impinging on the corresponding photodiodes PDX are transferred to respective associated charge storage elements FbX. It goes without saying that the charge storage elements FbX had been reset by accordingly controlling reset elements RbX prior to receiving the newly generated charges. Readout of the signal corresponding to the charges stored in charge storage elements FbX is performed in the generally known manner involving the amplifiers AbX and the switch elements SbX associated with the respective charge storage elements FbX. In the second readout mode the photodiodes PDX are reset by accordingly controlling transfer elements TaX and reset elements RaX. During reset of the photodiodes PDX in the second readout mode the charge storage elements FaX are also reset. In the second readout mode the amplifiers AaX and the switch elements SbX associated with the charge storage elements FaX are not used. The shading of the frames surrounding the sub-pixel cores 14 indicates the grouping into triplets of consecutive sub-pixel cores 14 in the second readout mode.

Global shutter operation is achieved by simultaneously resetting the photodiodes using the transfer elements and the reset elements not used for reading out the results of the respective grouping of sub-pixel cores in the respective readout mode.

Put in simple terms and using the two exemplary resolutions of 1080 or 720 vertical lines discussed further above the operation can be explained as follows: when reading 1080 vertical lines, the elements arranged on the left of the sub-pixel are used for readout and the elements arranged on the right of the sub-pixel are used for reset and global shutter functionality. When reading 720 vertical lines, the elements arranged on the right of the sub-pixel used for readout and the elements arranged on the left of the sub-pixel are used for reset and global shutter functionality.

Grouping of physical sub-pixel cores allows for achieving best image quality in either resolution mode, because no additional aliasing components are created from interpolation algorithms, etc. Further, the signal-to-noise ratio is improved when compared with cropping the image. Also, the same lens settings may be used independent of the resolution mode, and the field of view, depth of field and other optical properties remain the same in both resolution modes. Yet further, the lower resolution format allows for faster frame readout due to the reduced number of pixels to be read out. Binning of sub-pixel cores can advantageously be used for sensor systems not having any digital processing capability, for example systems having analogue output only. Further, the design implementation is on pixel level only. The column circuit blocks, the periphery, the timing control are not changed. Also externally to the IC, no changes to circuitry, signal processing, etc. are required.

Binning of horizontally adjacent pixels may be performed in the column readout circuitry or in subsequent processing steps. This allows for combining a number of sub-pixel cores in both directions, horizontally and vertically, for achieving a substantially square output pixel. Depending on the implementation, the light-sensitive area of a sub-pixel may not be perfectly square-shaped, but rather have a general rectangular shape.

The invention claimed is:

1. A CMOS image sensor having a plurality of pixel cells arranged in lines and columns,
    each one of the plurality of pixel cells having a photosensitive element that converts impinging light into electric charge, and first and second transfer elements,
    wherein the first transfer elements of groups of m pixel cells arranged consecutively in the same column are arranged for transferring the charges generated during exposure in the respective group of m photosensitive elements to a single charge storage element provided for the respective group of m pixel cells,
    wherein the second transfer elements of groups of n pixel cells arranged consecutively in the same column are arranged for transferring the charges generated during exposure in the respective group of n photosensitive elements to a single charge storage element provided for the respective group of n pixel cells, wherein each pixel cell belongs to one of the groups of m pixel cells and to one of the groups of n pixel cells, and
    wherein m is not equal to n.

2. The CMOS image sensor of claim 1,
    wherein, in case m pixel cells are grouped together, the second transfer elements are controllable to connect the photosensitive elements to a reset potential via corresponding reset elements of the associated charge storage elements, and
    wherein, in case n pixel cells are grouped together, the first transfer elements are controllable to connect the photosensitive elements to a reset potential via corresponding reset elements of the associated charge storage elements.

3. The CMOS image sensor of claim 1, wherein each of the charge storage elements, respectively, is provided with a reset element for resetting the charge storage element, wherein the reset elements switchably connect the respective charge storage element to a reset potential.

4. The CMOS image sensor of claim 1, wherein
    an amplifier is provided with each respective charge storage element and
    a switch element is provided with each amplifier that connects the output of the amplifier to one of a multiplicity of readout lines, each readout line being shared by multiple pixel cells arranged in the same column.

5. A method of controlling a CMOS image sensor in a dual resolution readout mode, the CMOS image sensor having a plurality of pixel cells arranged in lines and columns, each one of the pixel cells having a photosensitive element that converts impinging light into electric charge, and first and second transfer elements,
    wherein the first transfer elements of groups of m pixel cells arranged consecutively in the same column are arranged for transferring the charges generated during exposure in the respective group of m photosensitive elements to a single charge storage element provided for the respective group of m pixel cells, and
    wherein the second transfer elements of groups of n pixel cells arranged consecutively in the same column are arranged for transferring the charges generated during exposure in the respective group of n photosensitive elements to a single charge storage element provided for the respective group of n pixel cells,
    wherein each pixel cell belongs to one of the groups of m pixel cells and to one of the groups of n pixel cells, and
    wherein an amplifier is provided with each respective charge storage element and a switch element is provided with each amplifier, which switch element connects the output of the amplifier to one of a multiplicity of readout lines, each readout line being shared by multiple pixel cells arranged in the same column, wherein the method, in the first resolution readout mode, includes the steps of:
        resetting the photosensitive elements of groups of m consecutive pixel cells;
        exposing the CMOS image sensor to impinging light;
        after exposure, controlling the first transfer elements of the exposed pixel cells for transferring the charges accumulated during exposure to the respective single charge storage element associated with the respective group of m pixel cells;
        controlling the switch element associated with the respective charge storage element, to which the charge has been transferred, and the amplifier, for connecting the output of the amplifier to a readout line for enabling reading out a signal corresponding to an exposed group of pixel cells;
        after readout, resetting the charge storage elements associated with a respective group m of pixel cells;
    wherein the method, in the second resolution readout mode, includes the steps of:
        resetting the photosensitive elements of groups of n consecutive pixel cells, n not being equal to m;
        exposing the CMOS image sensor to impinging light;
        after exposure, controlling the second transfer elements of the exposed pixel cells for transferring the charges accumulated during exposure to the respective single charge storage element associated with the respective group of n pixel cells;
        controlling the switch element associated with the charge storage element, to which the charge has been transferred, and the amplifier, for connecting the output of the amplifier to a readout line for enabling reading out a signal corresponding to an exposed group of pixel cells; and
        after readout, resetting the charge storage elements associated with a respective group of n pixel cells.

6. The method of claim 5, further comprising the steps of, in the first or second resolution readout mode,
    controlling, after resetting and before exposing the photosensitive elements, the first or second transfer elements of the respective groups of consecutive pixel cells for transferring charges corresponding to the reset condition to the respective single charge storage element associated with the respective group of pixel cells;

controlling the switch element for connecting the output of the amplifier to a readout line for enabling reading out a signal corresponding to an unexposed group of pixel cells; and resetting the charge storage elements after reading out.

7. The method of claim 6, wherein carrying out the resetting step and the transfer step, respectively, is targeted to be simultaneous for all pixel cells in the CMOS image sensor.

8. The method of claim 5, wherein the photosensitive elements of all pixel cells are held in reset condition prior to beginning of exposure, and wherein, after the exposure time is over, the first or second transfer elements of all groups of pixel cells are controlled in a fashion targeting simultaneous transfer of the charges accumulated during exposure to the respective associated charge storage elements.

9. A CMOS image sensor having a plurality of pixel cells arranged in lines and columns,
   each one of the plurality of pixel cells having a photosensitive element that converts impinging light into electric charge and a first transfer element,
   at least one pixel cell of groups of n pixel cells arranged consecutively in the same column having a second transfer element,
   wherein the first transfer elements of groups of m pixel cells arranged consecutively in the same column are arranged for transferring the charges generated during exposure in the respective group of m photosensitive elements to a single charge storage element provided for the respective group of m pixel cells, m being smaller than n, and
   wherein the second transfer elements are arranged for selectively transferring the charge generated during exposure in the associated photosensitive elements to a single charge storage element provided for an adjacent group of m pixel cells in the same column.

10. The CMOS image sensor imager of claim 9,
    wherein, in case m pixel cells are grouped together, the first transfer elements are controllable to connect the photosensitive elements to a reset potential via corresponding reset elements of the associated charge storage elements, and
    wherein, in case n pixel cells are grouped together, the first transfer elements of those pixel cells having only first transfer elements and the second transfer elements of those pixel cells having first and second transfer elements are controllable to connect the photosensitive elements to a reset potential via corresponding reset elements of the associated charge storage elements.

11. The CMOS image sensor of claim 9, wherein each of the charge storage elements, respectively, is provided with a reset element for resetting the charge storage element, wherein the reset elements switchably connect the respective charge storage element to a reset potential.

12. The CMOS image sensor of claim 9, wherein an amplifier is provided with each respective charge storage element and a switch element is provided with each amplifier that connects the output of the amplifier to one of a multiplicity of readout lines, each readout line being shared by multiple pixel cells arranged in the same column.

13. A method of controlling a CMOS image sensor in a dual resolution readout mode, the CMOS image sensor having a plurality of pixel cells arranged in lines and columns, each one of the plurality of pixel cells having a photosensitive element that converts impinging light into electric charge and a first transfer element, at least one pixel cell of groups of n pixel cells arranged consecutively in the same column having a second transfer element, wherein the first transfer elements of groups of m pixel cells arranged consecutively in the same column are arranged for transferring the charges generated during exposure in the respective group of m photosensitive elements to a single charge storage element provided for the respective group of m pixel cells, m being smaller than n, wherein the second transfer elements are arranged for selectively transferring the charge generated during exposure in the associated photosensitive elements to a single charge storage element provided for an adjacent group of m pixel cells in the same column, and wherein an amplifier is provided with each respective charge storage element and a switch element is provided with each amplifier, which switch element connects the output of the amplifier to one of a multiplicity of readout lines, each readout line being shared by multiple pixel cells arranged in the same column, wherein the method, in the first resolution readout mode, includes the steps of:
    resetting the photosensitive elements of groups of m consecutive pixel cells;
    exposing the CMOS image sensor to impinging light;
    after exposure, controlling the first transfer elements of the exposed pixel cells for transferring the charges accumulated during exposure to the respective single charge storage element associated with the respective group of m pixel cells;
    controlling the switch element associated with the respective charge storage element, to which the charge has been transferred, and the amplifier, for connecting the output of the amplifier to a readout line for enabling reading out a signal corresponding to an exposed group of pixel cells;
    after readout, resetting the charge storage elements associated with a respective group m of pixel cells;
    wherein the method, in the second resolution readout mode, includes the steps of:
    resetting the photosensitive elements of groups of n consecutive pixel cells;
    exposing the CMOS image sensor to impinging light;
    after exposure, controlling the first transfer elements of those exposed pixel cells of a group of n pixel cells having only first transfer elements and controlling the second transfer elements of those exposed pixel cells of a group of n pixel cells having first and second transfer elements, for transferring the charges accumulated during exposure to the respective single charge storage element associated with the respective group of n pixel cells;
    controlling the switch element associated with the charge storage element, to which the charge has been transferred, and the amplifier, for connecting the output of the amplifier to a readout line for enabling reading out a signal corresponding to an exposed group of pixel cells; and
    after readout, resetting the charge storage elements associated with a respective group of n pixel cells.

14. The method of claim 13, further comprising the steps of, in the first or second resolution readout mode,
    controlling, after resetting and before exposing the photosensitive elements, the first or second transfer elements of the respective groups of consecutive pixel cells for transferring charges corresponding to the reset condition to the respective single charge storage element associated with the respective group of pixel cells;

controlling the switch element for connecting the output of the amplifier to a readout line for enabling reading out a signal corresponding to an unexposed group of pixel cells; and resetting the charge storage elements after reading out.

15. The method of claim 14, wherein carrying out the resetting step and the transfer step, respectively, is targeted to be simultaneous for all pixel cells in the CMOS image sensor.

16. The method of claim 13, wherein the photosensitive elements of all pixel cells are held in reset condition prior to beginning of exposure, and wherein, after the exposure time is over, the first or second transfer elements of all groups of pixel cells are controlled in a fashion targeting simultaneous transfer of the charges accumulated during exposure to the respective associated charge storage elements.

* * * * *